United States Patent Office 3,122,435
Patented Feb. 25, 1964

1

3,122,435
ELECTROPHOTOGRAPHIC MATERIAL

Robert Joseph Noë, Berchem-Antwerp, and Renaat Frans Heylen, Deurne-Antwerp, Belgium, assignors to Gevaert Photo-Producten N.V., Mortsel, Belgium, a Belgian company No Drawing. Filed Apr. 21, 1961, Ser. No. 104,504
Claims priority, application Belgium Apr. 22, 1960
9 Claims. (Cl. 96—1)

The present invention relates to an electrophotographic material and more particularly to an electrophotographic material consisting of a support and a photoconductive layer which contains an organic polymeric photoconductive substance or which consists of an organic polymeric photoconductive substance.

In our copending U.S. patent application Ser. No. 11,129, filed February 26, 1960, is disclosed an electrophotographic material comprising a photoconductive layer in contact with a conductive member or layer, said photoconductive layer consisting of or containing at least one organic polymeric compound containing or consisting of recurring groups having the general formula

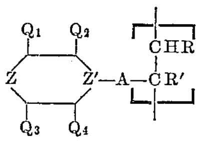

wherein:

A represents a single bond, or a divalent organic radical,
R and R′ each represents a hydrogen atom or a lower alkyl radical,
Z represents a sulphur atom or a single bond,
Z′ represents a methine group or a nitrogen atom,
$Q_1$ and $Q_2$ together represent the atoms necessary to complete an aromatic nucleus, and
$Q_3$ and $Q_4$ together represent the atoms necessary to complete an aromatic nucleus.

According to said patent application a series of suitable compounds which cause an increase of the sensitivity in the ultra-violet and visible wave range of the spectrum may also be incorporated in the photoconductive layers irrespective of whether or not they themselves possess photoconductive properties.

Now has been found that the general sensitivity in the ultra-violet and visible wave range of the spectrum and/or the sensitivity to electromagnetic rays of a particular wave range of the visible spectrum of the photoconductive layer of an electrophotographic material as described in said patent application, may also be increased by incorporating in this photoconductive layer in combination with a 1,2,3-triazole compound according to the following general Formulae I and II, a triarylmethane dyestuff with ring closure according to the general Formulae III and IV.

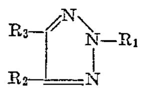

I and

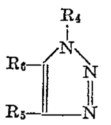

II wherein:

$R_1$, $R_2$, $R_3$, $R_4$, $R_5$ and $R_6$ each represents a member selected from the group consisting of a hydrogen atom, an alkyl group, a substituted alkyl group, an aryl group, a substituted aryl group, an amino group, a substituted amino group, a carboxyl group, a substituted carboxyl group, a hydroxyl group, a substituted hydroxyl group, a mercapto group and a substituted mercapto group, the grouping $R_2$ and $R_3$ together, and the grouping $R_5$ and $R_6$ together each represent the atoms necessary to complete a ring system of the class consisting of a carbocyclic nucleus, a substituted carbocyclic nucleus, a system of fused carbocyclic nuclei, a system of substituted fused carbocyclic nuclei, a heterocyclic nucleus, a substituted heterocyclic nucleus, a system of fused heterocyclic nuclei, and a system of substituted fused heterocyclic nuclei.

2

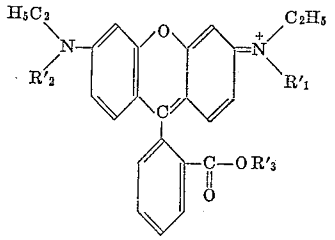

II wherein:

$R'_1$, $R'_2$ and $R'_3$ each represents a member selected from the group consisting of a hydrogen atom and an alkyl radical, such as an ethyl radical, and

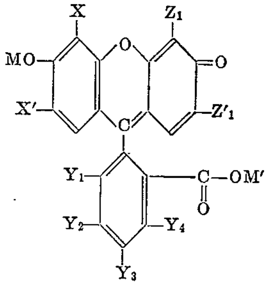

IV wherein:

M and M′ each represents a member selected from the group consisting of a hydrogen atom and an alkali metal atom,
X and $Z_1$ each represent a member selected from the group consisting of a hydrogen atom, a bromine atom, an iodine atom, and a hydroxyl group,
X′ and $Z'_1$ each represents a member selected from the group consisting of a hydrogen atom, a bromine atom and an iodine atom,
$Y_1$, $Y_2$, $Y_3$ and $Y_4$ each represents a member selected from the group consisting of a hydrogen atom and a chlorine atom.

The 1,2,3-triazole compounds preferably are used in an amount ranging from 0.1 to 5% based on the weight of the polymeric compound of the photoconductive layer, and the triaryl methane dyestuffs preferably are used in an amount ranging from 0.01 to 1% based on the weight of the polymeric compound of the photoconductive layer.

The compounds corresponding to the above mentioned Formulae I and II, which appeared from the experiments to give in combination with triaryl methane dyestuffs according to the general Formulae III and IV particularly good results when used for the preparation of the electrophotographic material according to the present invention, are identified hereinafter in Tables I and II.

TABLE I

*1,2,3-Triazoles According to the General Formula I*

| Compound | $R_1$ | $R_2$ | $R_3$ |
|---|---|---|---|
| 1 | $C_6H_5$ | 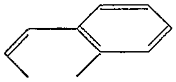 | |
| 2 | 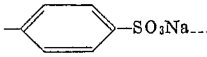 | 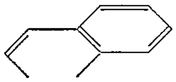 | |
| 3 | 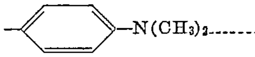 | 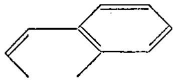 | |
| 4 | 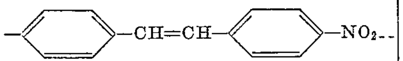 | 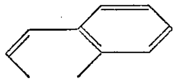 | |

TABLE II

*1,2,3-Triazoles According to the General Formula II*

| Compound | $R_4$ | $R_5$ | $R_6$ |
|---|---|---|---|
| 5 | H | $COOC_2H_5$ | $CH_3$ |
| 6 | $NH-C_6H_5$ | $COOC_2H_5$ | $CH_3$ |
| 7 | $NH-CO-NH_2$ | $COOC_2H_5$ | $CH_3$ |
| 8 | H | 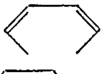 | |
| 9 | H | 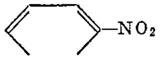 | |
| 10 | $CH_3$ | 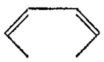 | |
| 11 | $CH_3$ | 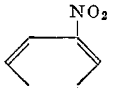 | |
| 12 | $CH_3$ |  | |
| 13 | H | 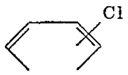 | |
| 14 | H | 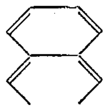 | |

As such compounds corresponding to one of the above mentioned Formulae III and IV which give in combination with the 1,2,3-triazole compounds according to the general Formulae I and II very good sensitizing effects when incorporated in the photoconductive layer of the electrophotographic material according to the present invention can be mentioned—

According to Formula III:
- Rhodamine G extra (C.I. 45150)
- Rhodamine B (C.I. 45170)
- Rouge Fanal 6 B Supra pâte and Rouge Fanal Supra poudre (both C.I. 45175)

According to Formula IV:
- Erythrosine Blaulich (C.I. 45430)
- Rose Bengale N, Rose Bengale Double conc. and Rose Bengale (all C.I. 45440)
- Gallein MS. (C.I. 45445)
- Phloxin BBN (C.I. 45410 A)
- Erythrosine (C.I. 45430)
- Fluoreszein Natrium (C.I. 45350)

Further details according to the preparation of an electrophotographic material, the addition of other photoconductive compounds and sensitizers, as well as the incorporation in the photoconductive layer of additives well known in the technique of coating such as plasticizers and pigments, the choice of the support and the techniques used on applying the photoconductive layers to the support are known to those skilled in the art and can also be taken from our U.S. patent application Ser. No. 11,129, filed February 26, 1960. Regarding the use of the obtained photographic material, the electrostatic charging of this photographic material, the formation and the development of the latent image, the transfer (if any) of the image to another support and the methods for fixing the developed image, it may also be referred to the particulars stated in our said U.S. patent application Ser. No. 11,129, filed February 26, 1960.

The following examples illustrate the invention without limiting, however, the scope thereof.

EXAMPLE 1

On a baryta coated photographic paper of 90 g./sq.m. is applied a layer from a solution consisting of:

| | |
|---|---|
| Copoly(N-vinylcarbazole/methylacrylate) (46.6/53.4) ____g__ | 10 |
| Methylene chloride ____cm.$^3$__ | 100 |
| Rhodamine B (C.I. 45170) ____mg__ | 40 |
| Compound 8 of Table II ____mg__ | 100 |

After drying the thickness of the layer amounts to 7μ. The electrophotographic material thus obtained is negatively charged with a corona device and next a positive microfilm image is projected on the light-sensitive layer. A linear enlargement of 4 times requires an exposure time of 30 sec. with a 75 watt lamp. The latent image formed is developed by dusting with a mixture of the following composition: 100 parts of iron powder and 5 parts Toner P 648 (trade name for a xerographic developing dyestuff manufactured by General Photo Products Co., Inc., Chatham, N.J., U.S.A.) and fixed by heat. The final image is a clear copy of the original.

If compound 4 of Table I is not added to said solution, a twice as long exposure time is required for obtaining a similar result.

Similar results are obtained by substituting for Rhodamine B the following dyestuffs:

Rouge Fanal 6 B Supra poudre (C.I. 45175)
Rose Bengale Double conc. (C.I. 45440)
Crystal Violet (C.I. 42555)

EXAMPLE 2

To a baryta coated photographic paper of 90 g./sq.m. is applied a layer from the following solution:

| | |
|---|---|
| Poly(N-vinylcarbazole) ______ g.__ | 4 |
| Methylene chloride ______ cm.$^3$__ | 100 |
| Compound 4 of Table I ______ mg.__ | 100 |
| Phenolsulphophthaleine (Phenolrot-Merck-Darmstadt) ______ mg.__ | 10 |

After drying the thickness of the layer amounts to 8μ. The photographic material thus obtained is negatively charged with a corona device and next the light sensitive layer is exposed for 2 sec. through a transparent original with a 100 watt lamp placed at a distance of 10 cm. The latent image formed is developed and fixed as in Example 1. The final image is a strong copy of the original.

Similar results are obtained with the dyestuffs:

Vert diamant GX (C.I. 42040)
Blue Zapon Solide 3 G (C.I. 51005)
Turchese segnale luce NB (C.I. 74160)
Indulin Scarlet (C.I. 50080)

EXAMPLES 3–9

Similar results as in Example 2 are obtained by substituting the following sensitizers for the compound 4 of Table I:

| | Sensitizer |
|---|---|
| Example 3 ______ | Compound 1 of Table I. |
| Example 4 ______ | Compound 2 of Table I. |
| Example 5 ______ | Compound 8 of Table II. |
| Example 6 ______ | Compound 9 of Table II. |
| Example 7 ______ | Compound 11 of Table II. |
| Example 8 ______ | Compound 12 of Table II. |
| Example 9 ______ | Compound 13 of Table II. |

What we claim is:

1. An electrophotographic material comprising a photoconductive layer consisting essentially of a polymeric compound containing recurring units having the general formula

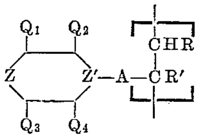

wherein

A represents a member selected from the group consisting of a single bond and a divalent organic radical;
R and R′ each represents a member selected from the group consisting of a hydrogen atom and a lower alkyl radical,
Z represents a member selected from the group consisting of a sulphur atom and a single bond,
Z′ represents a member selected from the group consisting of a methine group and a nitrogen atom,
$Q_1$ and $Q_2$ together represent the atoms necessary to complete an aromatic nucleus, and
$Q_3$ and $Q_4$ together represent the atoms necessary to complete an aromatic nucleus, and containing 0.01 to 1% based on the weight of said polymeric compound of a dyestuff of the group consisting of an oxazine dyestuff, a diazine dyestuff, a phthalocyanine dyestuff and a triarylcarbenium salt which is of the group consisting of a triarylmethane dyestuff and a phthalein dyestuff and 0.1 to 5% based on the weight of said polymeric compound of a 1,2,3-triazole compound having a formula selected from the group consisting of:

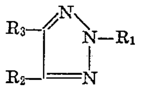 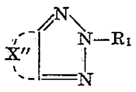

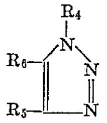 and 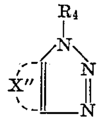

wherein $R_1$ represents a member selected from the group consisting of alkyl and an aryl radical;
$R_2$ represents a member selected from the group consisting of alkyl and aryl;
$R_3$ represents a member selected from the group consisting of alkyl and aryl;
$R_4$ represents the member selected from the group consisting of hydrogen, alkyl, aryl, alkyl-substituted amino, and an ureido group;
$R_5$ represents a member selected from the group consisting of alkyl, aryl and a carbalkoxy radical;
$R_6$ represents a member selected from the group consisting of alkyl and aryl, and
X″ represents the atoms necessary to complete an aromatic ring system.

2. An electrophotographic material comprising a photoconductive layer consisting essentially of a polymeric compound containing recurring units having the general formula

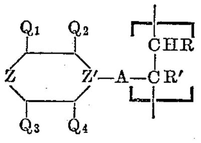

wherein

A represents a member selected from the group consisting of a single bond and a divalent organic radical,
R and R′ each represents a member selected from the group consisting of a hydrogen atom and a lower alkyl radical,
Z represents a member selected from the group consisting of a sulphur atom and a single bond,
Z′ represents a member selected from the group consisting of a methine group and a nitrogen atom,
$Q_1$ and $Q_2$ together represent the atoms necessary to complete an aromatic nucleus, and
$Q_3$ and $Q_4$ together represent the atoms necessary to complete an aromatic nucleus, and containing (*a*) 0.01 to 1% based on the weight of said polymeric compound of a triarylmethane dyestuff with ring closure having a formula selected from the group consisting of:

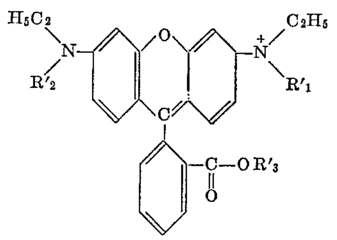

wherein:

$R'_1$, $R'_2$ and $R'_3$ each represents a member selected from the group consisting of a hydrogen atom and an alkyl radical, and

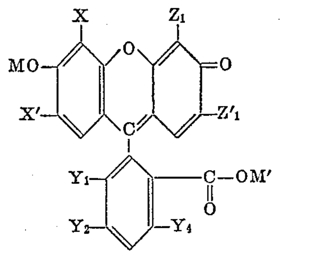

wherein:

M and M′ each represents a member selected from the group consisting of a hydrogen atom and an alkali metal atom;

X and $Z_1$ each represents a member selected from the group consisting of a hydrogen atom, a bromine atom, an iodine atom, and a hydroxyl group, X′ and $Z'_1$ each represents a member selected from the group consisting of a hydrogen atom, a bromine atom and an iodine atom, $Y_1$, $Y_2$, $Y_3$ and $Y_4$ each represents a member selected from the group consisting of a hydrogen atom and a chlorine atom;

and (*b*) 0.1 to 5% based on the weight of said polymeric compound of a 1,2,3-triazole compound having a formula selected from the group consisting of:

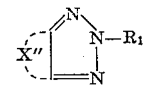

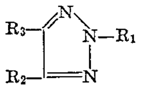

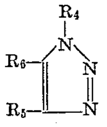

and

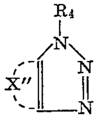

wherein:

$R_1$ represents a member selected from the group consisting of aryl and an aryl radical;

$R_2$ represents a member selected from the group consisting of alkyl and aryl;

$R_3$ represents a member selected from the group consisting of alkyl and aryl;

$R_4$ represents the member selected from the group consisting of hydrogen, alkyl, aryl, alkyl-substituted amino, and an ureido group;

$R_5$ represents a member selected from the group consisting of alkyl, aryl and a carbalkoxy radical;

$R_6$ represents a member selected from the group consisting of alkyl and aryl, and X″ represents the atoms necessary to complete an aromatic ring.

3. The material of claim 1 wherein said dyestuff is a triarylcarbenium salt with ring closure by an oxygen atom.

4. The material of claim 1 wherein said photo-conductive layer is in intimate contact with a conductive backing member.

5. The material of claim 2 wherein said photo-conductive layer is in intimate contact with a conductive backing member.

6. A photographic reproduction process which comprises electrostatically charging the electrophotographic material of claim 1 and exposing said material to a light image, whereby a pattern of electrostatic charges according to said light image is created in said material, and developing a visible image of said light image by means of said pattern of electrostatic charges.

7. A photographic reproduction process which comprises electrostatically charging the electrophotographic material of claim 2 and exposing said material to a light image, whereby a pattern of electrostatic charges according to said light image is created in said material, and developing a visible image of said light image by means of said pattern of electrostatic charges.

8. A photographic reproduction process which comprises electrostatically charging the electrophotographic material of claim 4 and exposing said material to a light image, whereby a pattern of electrostatic charges according to said light image is created in said material, and developing a visible image of said light image by means of said pattern of electrostatic charges.

9. A photographic reproduction process which comprises electrostatically charging the electrophotographic material of claim 5 and exposing said material to a light image, whereby a pattern of electrostatic charges according to said light image is created in said material, and developing a visible image of said light image by means of said pattern of electrostatic charges.

References Cited in the file of this patent

UNITED STATES PATENTS 3,037,861 Hoegl et al. ............ June 5, 1962